United States Patent

[11] 3,624,559

[72] Inventor Louis Carl Schaeperkoetter, Jr. McMurray, Pa.

[21] Appl. No. 254
[22] Filed Jan. 2, 1970
[45] Patented Nov. 30, 1971
[73] Assignee RCA Corporation

[54] PHASE OR FREQUENCY MODULATOR USING PIN DIODES
12 Claims, 6 Drawing Figs.

[52] U.S. Cl. .......... 332/24, 307/321, 332/31 R
[51] Int. Cl. .......... H03c 3/26
[50] Field of Search .......... 332/21, 24, 23, 43, 43 B, 47, 31; 307/321

[56] References Cited

UNITED STATES PATENTS

| | | | |
|---|---|---|---|
| 2,811,693 | 10/1957 | Holzwarth et al. | 332/47 X |
| 3,153,206 | 10/1964 | Fisher | 332/47 |
| 3,202,940 | 8/1965 | Dietrich | 307/321 X |
| 3,205,457 | 9/1965 | Bell | 332/43 (B) X |

*Primary Examiner*—Alfred L. Brody
*Attorney*—Edward J. Norton

ABSTRACT: An angle modulator employing PIN diodes in a balanced circuit to provide improved linear angle variation over a wide range of modulating signal amplitudes and frequencies.

INVENTOR.
Louis C. Schaeperkoetter
BY
Edward J. Norton
ATTORNEY

INVENTOR.
Louis C. Schaeperkoetter
BY
Edward J. Norton
ATTORNEY

PHASE OR FREQUENCY MODULATOR USING PIN DIODES

BACKGROUND OF THE INVENTION

This invention relates to circuitry for angle modulating a carrier signal.

Angle modulation is a form of modulation in which the phase of a carrier signal is made to vary with time in accordance with a modulating signal. A substantially linear variation of phase angle with the amplitude of the modulating signal is desired. Angle modulation includes frequency modulation as well as phase modulation.

A limitation found in many prior art angle modulators is that modulation is linear only for small changes in carrier phase angle. Linear angular displacements of 10° to 15° have been usual for simple angle modulation circuits. In order to obtain wider linear angular variations, tandem modulators and multiplying circuits have heretofore been required.

Other disadvantages of prior art angle modulators are (*i*) poor stability because of the characteristics of the nonlinear active elements employed in the modulators, (*ii*) the necessity of varying a reactive element of a tuned circuit for modulating the angle of the applied carrier signal, (*iii*) the limited usable range of modulating frequencies, and (*iv*) catastrophic overload characteristics.

An object of this invention is to provide an angle modulator which is substantially temperature stable, requires no tuning, is useful over a wide range of modulating frequencies, provides linear angle modulation over a large angular range, and has soft overload characteristics.

SUMMARY

The invention herein described covers circuitry for angle modulating a carrier signal in accordance with the amplitude variations of a modulating signal.

The circuitry includes means for providing a first high-frequency carrier signal between a first terminal and a common terminal and a second high-frequency carrier signal between a second terminal and the common terminal. The first and second signals are of the same frequency and substantially 180° out of phase with respect to each other. Means are provided for coupling a reference carrier signal of the same high frequency between an output terminal and a point of reference potential. The reference signal is 90° out of phase with respect to each of the first and second high-frequency signals.

Two nonlinear resistance elements are connected in alternating current series circuit between the first and second terminals. Each of the nonlinear elements has a voltage-current characteristic which exhibits an incremental resistance which decreases with increasing current in a substantially logarithmic manner. Means are provided for biasing the two nonlinear elements so that the elements are conductive regardless of the amplitudes of the modulating signal and the high-frequency carrier signals.

The point between the series-connected nonlinear elements, remote from the first and second terminals, is coupled to the output terminal. Means are also provided for applying the modulating signal between one of the terminals and the point of reference potential. The modulating signal serves to increase the bias current flowing through one of the nonlinear elements while simultaneously decreasing the bias current flowing through the other element. This causes a decrease in the incremental resistance of one element and an increase of the incremental resistance of the other element, thus varying the amplitude of the high-frequency signal which is coupled from the first and second terminals to the output terminal. The coupled signal combines with the reference signal to provide a carrier signal of varying phase angle between the output terminal and the point of reference potential.

IN THE DRAWINGS

Figure 1:
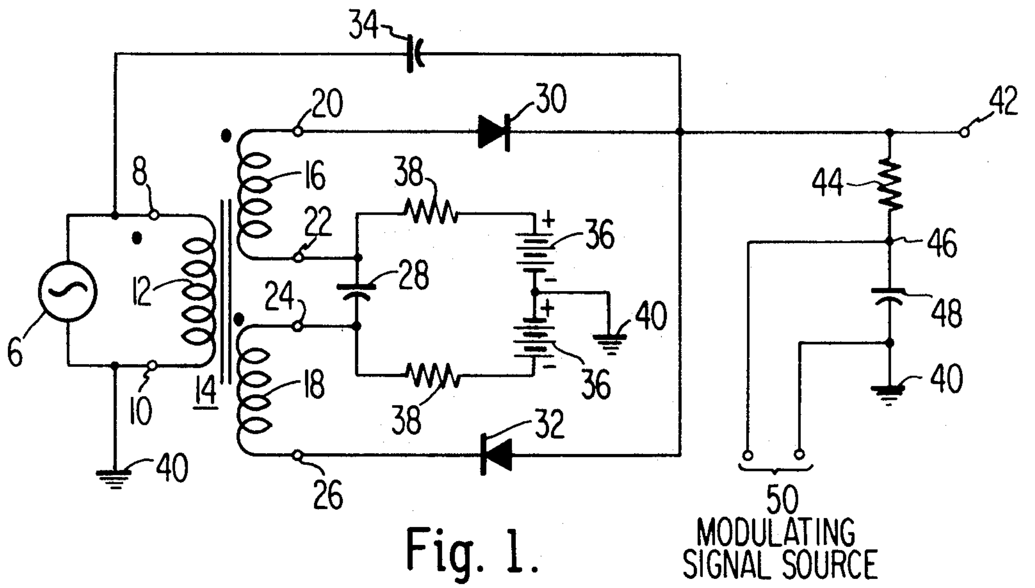
FIG. 1 is a circuit diagram of an angle modulator according to an embodiment of the invention.
Figure 4:
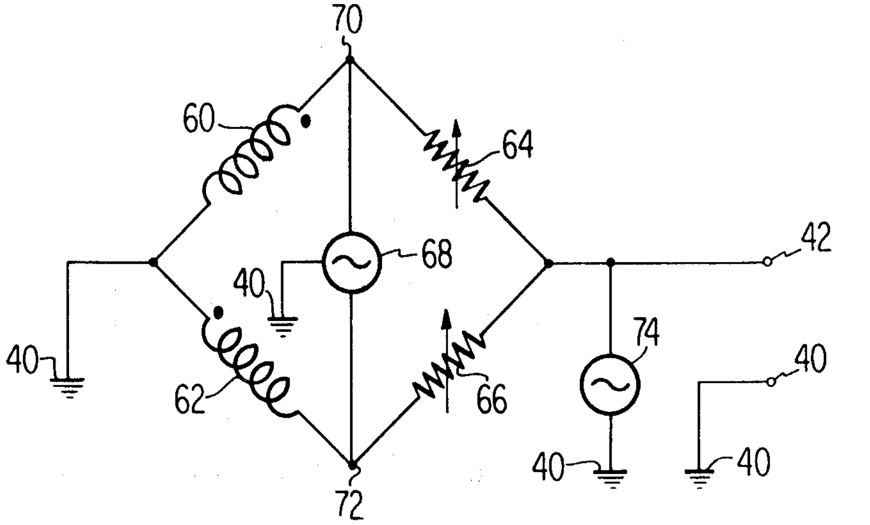
Figure 5:
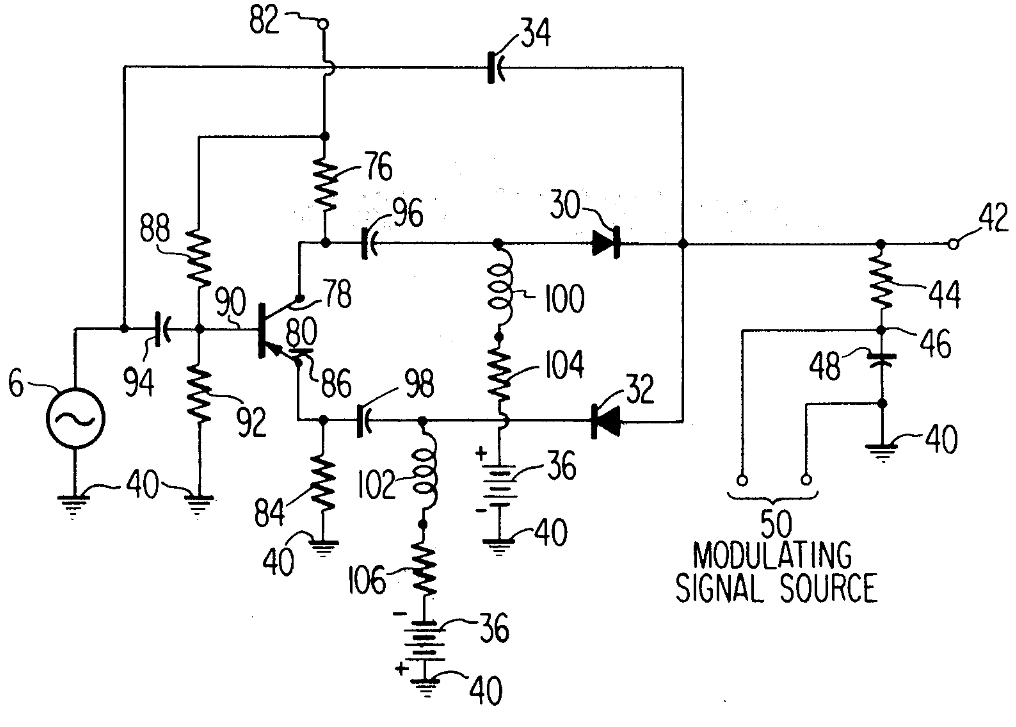

FIGS. 3*a* and 3*b* are vector diagrams showing relative phase relationships in the circuit of FIG. 1, (*b*) with, and (*c*) without a modulating signal;

FIG. 4 shows the high-frequency equivalent circuit of the circuit shown in FIG. 1; and FIG. 5 is a circuit diagram of an angle modulator incorporating a transistor phase splitter according to an alternative embodiment of the invention.

As shown in FIG. 1, a high-frequency carrier signal source 6 is connected between terminals 8 and 10 of the primary winding 12 of a transformer 14. The secondary of the transformer 14 includes first and second secondary windings 16 and 18. The first secondary winding 16 has terminals 20 and 22, while the second secondary winding has terminals 24 and 26. Secondary windings 16 and 18 are coupled together in a series-aiding relationship at terminals 22 and 24 through coupling capacitor 28. The voltage across the first secondary winding 16 is preferably substantially of the same magnitude as the voltage across the second secondary winding 18. The two voltages are of the same frequency and substantially 180° out of phase with respect to each other. Connected in alternating current series circuit between terminals 20 and 26 of secondary windings 16 and 18 are two nonlinear resistance elements 30 and 32. The nonlinear resistance elements 30 and 32 may, for example, be PIN diodes having substantially matched voltage-current characteristics. Each PIN diode has a voltage-current characteristic which exhibits an incremental resistance which decreases with increasing current in a substantially logarithmic manner.

Figure 2:
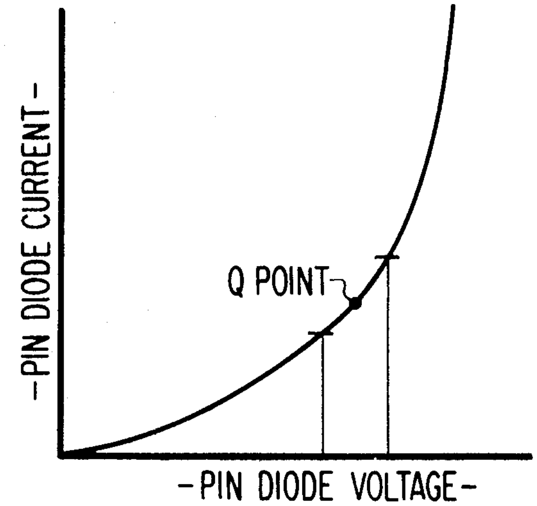
FIG. 2 is a graph of the voltage-current characteristic of a forward biased PIN diode.

A typical voltage-current characteristic for a forward biased PIN diode is shown in FIG. 2. A PIN diode behaves more as a variable resistor than as a conventional diode. The incremental resistance of the PIN diode varies with its operating point and may be controlled by a DC or low-frequency signal which varies the operating voltage or current of the diode. If the high-frequency signal applied to the diode causes the operating point to vary only slightly, then the resistance will be a constant for a particular bias condition.

For angle modulation, the PIN diode is usually forward biased so that it presents a linear passive resistance to the applied high-frequency signal. For sufficiently high values of forward bias, the incremental resistance of the PIN diode can be calculated from the following relationship:

$$R=K/I^X$$

where $I$ is the forward bias current, $K$ is a parameter of a particular diode which typically can vary from 10 to 50, and $X$ is the slope of the Incremental Resistance vs. Forward Bias Curve, which can vary from 0.86 to 0.90 for silicon PIN diodes.

Many prior art angle modulators have suffered from catastrophic overload characteristics due to clipping of the modulated carrier signal. Wideband interference and distortion resulted from the clipped signal. The logarithmic characteristic of the PIN diode allows for operation over wide ranges of signal amplitudes, with gradual limiting and decreased resultant distortion.

For a further discussion of PIN diodes, reference may be made to Hewlett Packard Associates, Application Note NO. 904, The PIN Diode, 15, Feb. 1966.

A second capacitor 34 is connected between terminal 8 of the primary winding 12 of transformer 14 and the junction formed by the intersection of the two PIN diodes 30 and 32. The value of the capacitor 34 is selected to shift phase of the high-frequency carrier signal applied to the primary winding 12 of the transformer 14 by 90° , so that the voltage contributed by capacitor 34 at the junction is 90° out of phase with each of the voltages contributed by PIN diodes 30 and 32 at the junction. A center-tapped voltage source 36 with current-limiting resistors 38, is connected between terminals 22 and 24 in parallel with coupling capacitor 28. The center tap of the voltage source 36 is connected to a point of reference potential 40, such as ground. The voltage source 36 is chosen to have a magnitude sufficiently high so that the two PIN diodes 30 and 32 are always positively biased, and conductive regardless of the amplitudes of other signals flowing in the circuit. The output terminal 42 is connected to the junction formed by the intersection of the two PIN diodes 30 and 32. One terminal of an output resistor 44 is connected to output terminal 42 while the other terminal 46 of the resistor 44 is connected to a blocking capacitor 48. The other terminal of the blocking capacitor 48 is connected to the point of ground potential 40.

A modulating signal source 50 is connected between (*i*) terminal 46 at the junction of the output resistor 44 and the blocking capacitor 48 and (*ii*) ground 40. The modulating signal source 50 serves to increase the bias current flowing through one of the PIN diodes while simultaneously decreasing the bias current flowing through the other PIN diode, so as to decrease the incremental resistance of the one PIN diode while increasing the incremental resistance of the other PIN diode. This causes a variation in the amplitude of the high-frequency signal which is coupled from terminals 20 and 26 to the output terminal 42. The resulting variable amplitude high-frequency signal coupled to terminal 42 combines vectorially, at the output terminal 42, with the fixed amplitude signal coupled through capacitor 34 to provide a carrier signal of varying phase angle between the output terminal 42 and the point of reference potential 40.

Figure 3:
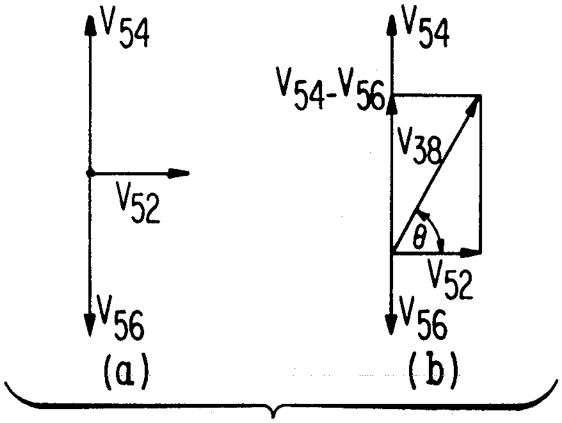

The voltage magnitude and phase relationships associated with the circuit of FIG. 1 will be better understood by reference to the vector diagrams of FIG. 3, in which $V_{52}$ represents the voltage contributed by capacitor 34 and is to be taken as the reference vector, while $V_{54}$ and $V_{56}$ represents the voltage contributed by PIN diodes 30 and 32 respectively. FIG. 3*a* shows the high-frequency vector voltage relationships at the output terminal 42 with no applied modulating signal. FIG. 3*b* shows these vector voltage relationships with an applied modulating signal. With no modulating signal applied, the incremental resistances of PIN diodes 30 and 32 are, e.g., substantially equal, and the voltages contributed by PIN diodes 30 and 32 ($V_{54}$ and $V_{56}$) are substantially equal in magnitude and 180° out of phase. Vector voltages $V_{54}$ and $V_{56}$ cancel each other so that $V_{52}$ represents the resultant output signal.

A negative applied modulating signal causes the incremental resistance of PIN diode 30 to decrease while simultaneously increasing the incremental resistance of PIN diode 32. Correspondingly, $V_{54}$ increases in magnitude while $V_{56}$ decreases in magnitude, and the tow voltages no longer cancel. The resultant signal is the vector sum of the reference voltage, $V_{52}$, and the difference in magnitude between $V_{54}$ and $V_{56}$. The phase angle, θ, of the resultant signal $V_{58}$ is dependent upon the difference in magnitudes between $V_{54}$ and $V_{56}$, and this difference is a function of the amplitude of the modulating signal.

In a laboratory model of an angle modulator similar to the circuit of FIG. 1, the amplitudes of the modulating signal and the high-frequency carrier signal were adjusted for maximum radian swing at minimum distortion. Specifically, for a 12 kHz. modulating signal, a phase shift of ±1 radian was obtained with a total harmonic distortion unweighted of 10 percent in the demodulated output signal and for a 10 kHz. modulating signal, a phase shift of ±0.83 radian was obtained with 6 percent total harmonic distortion. Large radian swing at low distortion levels can be achieved because of the logarithmic characteristics of the PIN diode. Existing PIN diodes have an incremental resistance variation which will logarithmically track currents over 3 decades of resistance.

The circuit of FIG. 1 can be viewed in terms of its high-frequency equivalent circuit as shown in FIG. 4. Like numbers in FIG. 1 and FIG. 4 correspond. In FIG. 4, inductors 60 and 62 represent the reactance of the secondary windings 16 and 18 of transformer 14 of FIG. 1. For purposes of a high-frequency equivalent circuit, PIN diodes can be viewed as variable resistors with the value of resistance being a function of the applied modulating signal. Variable resistors 64 and 66 correspond to PIN diodes 30 and 32 of FIG. 1.

The equivalent circuit of FIG. 4 is a bridge, with serially connected inductors 60 and 62 forming one arm of the bridge and variable resistors 64 and 66 forming the other arm. High-frequency carrier signal source 68, corresponding to the voltage appearing between terminals 20 and 26 of FIG. 1, is connected between the arms of the bridge at junctions 70 and 72. The resistances of variable resistors 64 and 66 are equal when no modulating signal is applied to the bridge circuit, and the arms of the bridge are therefore in balance with respect to the high-frequency carrier signal 68 so that no portion of the signal appears between output terminal 42 and ground 40.

An applied modulating signal (not shown in FIG. 4) causes the resistance of one resistor to increase while simultaneously causing the resistance of the other resistor to decrease, thus unbalancing the arms of the bridge. Because of the bridge unbalance, a portion of the high-frequency carrier signal 68, having an amplitude which varies with the amplitude of the applied modulating signal, appears between the output terminals 40 and 42 of the bridge circuit. This variable amplitude signal combines with a reference signal 74, corresponding to the signal coupled through capacitor 34 of FIG. 1, of the same frequency but 90° out of phase with respect to the variable amplitude signal to provide a carrier signal of varying phase angle.

An alternative embodiment of the invention incorporating a transistor phase splitter as the means of applying to PIN diodes 30 and 32 high-frequency carrier signals substantially 180° out of phase with respect to each other is shown in FIG. 5. In the circuit shown in FIG. 5, a first resistor 76 is connected from the collector 78 of PNP-transistor 80 to a terminal 82 which is connected to a source of bias voltage (not shown). A second resistor 84, substantially equal in value to the first resistor 76, is connected from the emitter terminal 86 of transistor 80 to a point of reference potential 40. A third resistor 88, connected between terminal 82 and the base terminal 90 of transistor 80, and a fourth resistor 92, connected between the base terminal 90 of transistor 80 and the point of reference potential 40 provide operating bias for the transistor 80.

High-frequency carrier signal source 6 is coupled through a first capacitor 94 to the base terminal 90 of transistor 80, so that a first high-frequency wave corresponding to the signal from the source 6 appears at the collector terminal 78 and a second high-frequency signal wave 180° out of phase with the first wave appears at the emitter terminal 86.

The collector terminal 78 of the transistor 80 is coupled through a second capacitor 96 to one terminal of PIN diode 30. The other terminal of PIN diode 30 is connected to one terminal of PIN diode 32. The other terminal of PIN diode 32 is coupled through a third capacitor 98 to the emitter terminal of the transistor 80, so that the two PIN diodes 30 and 32 are connected in alternating current series circuit between the collector 78 and emitter 86 terminals of the transistor 80.

The high-frequency carrier signal source 6 is also coupled through a fourth capacitor 34 to the junction formed by the interconnection of the two PIN diodes 30 and 32. The value of the capacitor 34 is selected to shift the phase of the high-frequency carrier signal applied to the base terminal 90 of the transistor 80, by 90° so that the voltage coupled through capacitor 34 to the junction is 90° out of phase with each of the voltages contributed by PIN diodes 30 and 32 at the junction.

DC voltage source 36 and RF (radio frequency) choke inductors 100 and 102 and current-limiting resistors 104 and 106 are chosen to provide bias for the two PIN diodes 30 and 32, so that the PIN diodes are always forward biased and therefore conductive regardless of the amplitudes of other signals flowing in the circuit.

Elements 42, 44, 46, 48 and 50 of FIG. 5 correspond to the same numbered elements in FIG. 1 When a negative modulating signal source 50 is applied to the circuit, the resistance of PIN diode 30 decreases; simultaneously, the resistance of PIN diode 32 increases. This causes a variation in the amplitude of the highefrequency signal which is coupled through PIN diodes 30 and 32 to the output terminal 42. The resulting variable amplitude high-frequency signal coupled to terminal 42 combines, at the output terminal 42, with the fixed amplitude signal coupled through capacitor 34 to provide a carrier signal of varying phase angle between output terminal 42 and ground 40.

What is claimed is:

1. A circuit for angle modulating a carrier signal in accordance with the amplitude variations of a modulating signal, comprising:

means for providing a first high-frequency carrier signal between a first terminal and a common terminal and a second high-frequency carrier signal between a second terminal and said common terminal, said first and second signals being of the same given frequency and substantially 180° out of phase with respect to each other;

means for providing a reference carrier signal of said given frequency between an output terminal and a point of reference potential, said reference signal being 90° out of phase with respect to each of said first and second high-frequency signals;

means for connecting two nonlinear resistance elements in alternating current series circuit between said first and second terminals, each element having a voltage-current characteristic which exhibits an incremental resistance which decreases with increasing current in a substantially logarithmic manner;

means for biasing the two nonlinear elements so that the elements are conductive independent of the amplitudes of the modulating signal and the high-frequency carrier signals;

means for coupling said output terminal to a point between said series connected elements and remote from said first and second terminals; and means for applying said modulating signal between (*i*) another point between said series connected elements and remote from said first and second terminals and (*ii*) said point of reference potential, said modulating signal serving to increase the bias current flowing through one of said nonlinear elements while simultaneously decreasing the bias current flowing through the other element, so as to decrease the incremental resistance of said one element and increase the incremental resistance of said other element thus varying the amplitude of the high-frequency signal which is coupled from said first and second terminals to said output terminal, said coupled signal combining with said reference signal to provide a carrier signal of varying phase angle between said output terminal and said point of reference potential.

2. A circuit according to claim 1 wherein said nonlinear resistance elements are PIN diodes having substantially matched voltage-current characteristics.

3. A circuit according to claim 2 wherein said first high-frequency carrier signal is substantially of the same magnitude as said second high-frequency carrier signal.

4. A circuit according to claim 1 wherein the ratio of the magnitudes, at the output terminal, of the varying amplitude high-frequency carrier signal and the reference signal is on the order of 1.5 to 1.

5. A circuit for angle modulating a carrier signal in accordance with the amplitude variations of a modulating signal, comprising in combination:

a balanced bridge circuit including first and second serially connected inductors forming one arm of the bridge, and first and second serially connected nonlinear resistance elements forming the other arm of the bridge, each of said nonlinear elements having a voltage-current characteristic which exhibits an incremental resistance which decreases with increasing current in a substantially logarithmic manner;

means for applying a first high-frequency carrier signal between a first terminal formed at the junction of the first inductor and the first nonlinear element and a second high-frequency carrier signal between a second terminal formed at the junction of the second inductor and second nonlinear element, said first and second signals being of the same given frequency and substantially 180° out of phase with respect to each other;

means for biasing the two nonlinear elements so that the elements are conductive independent of the amplitudes of the modulating signal and the high-frequency carrier signal;

means for providing a high-frequency reference carrier signal of said given frequency between a third terminal at the junction of said nonlinear elements and a point of reference potential, said carrier signal being 90° out of phase with respect to each of said first and second high-frequency signals;

the junction of said inductors defining a fourth terminal;

means for applying a modulating signal between said point of reference potential and said third terminal; and an output circuit coupled to said third terminal, said bridge circuit being balanced with respect to said high-frequency carrier signal when on modulating signal is applied, so that in the absence of said modulating signal a predetermined part of said high-frequency carrier signal appears at the output terminal, said modulating signal causing the incremental resistance of one of the nonlinear elements to increase while simultaneously causing the incremental resistance of the other element to decrease, thus unbalancing the bridge so that a portion of the high-frequency carrier signal having an amplitude which varies with the amplitude of the modulating signal appears at the output of the bridge circuit, said signal combining with the reference signal at the output terminal to provide a carrier signal of varying phase angle.

6. A circuit according to claim 5, wherein in the absence of said modulating signal no part of said high-frequency carrier signal appears at said output terminal.

7. A circuit according to claim 5 wherein the bias voltage and the modulating signal can be interchanged.

8. A circuit for angle modulating a carrier signal in accordance with the amplitude variations of a modulating signal, comprising in combination:

a transformer having a primary winding and first and second secondary windings, said secondary windings being coupled together in series aiding relationship with a first terminal of the first winding connected to a first terminal of the second winding through a coupling capacitor, the second terminal of the first winding being connected to one electrode of a first nonlinear resistance element and the second terminal of the second winding being connected to one electrode of a second nonlinear resistance element, the other electrode of said first nonlinear resistance element being connected to the other electrode of the second nonlinear resistance element, such that the two nonlinear resistance elements are connected in alternating current series circuit between the second terminals of the first and second secondary windings;

means for applying a high-frequency carrier signal between the terminals of the primary winding;

a second capacitor having one terminal connected to the primary winding and a second terminal connected to the junction formed by the interconnection of the two nonlinear resistance elements, the value of the second capacitor being selected to shift the phase of said high-frequency carrier signal applied to the primary winding by 90°;

means for applying a bias voltage between said first terminal of the first secondary winding and said first terminal of the second secondary winding;

a first resistor having (*i*) one terminal connected to the junction formed by the interconnection of the two nonlinear resistance elements and the second terminal of the second capacitor and (*ii*) a second terminal connected to one terminal of a second coupling capacitor, the other terminal of said second coupling capacitor being connected to a point of reference potential;

means for coupling a modulating signal between said second terminal of the first resistor and said point of reference potential, said modulating signal serving to increase the impedance presented by one nonlinear resistance element to the high-frequency carrier signal while simultaneously decreasing the impedance presented by the other nonlinear resistance element to the high-frequency carrier signal, thus providing a high-frequency signal at said output terminal the amplitude of which varies with the amplitude of the modulating signal, said variable amplitude high-frequency signal combining with said reference signal to provide a carrier signal of varying phase angle between the first terminal of said first resistance element and said point of reference potential.

9. A circuit according to claim 8 wherein a center tapped DC voltage source, with the center tap connected to the point of reference potential, is connected between the first terminal of the first secondary winding and the first terminal of the second secondary winding.

10. A circuit according to claim 8 wherein the voltage between the two terminals of the first secondary winding is substantially of the same magnitude as the voltage between the two terminals of the second secondary winding.

11. A circuit for angle modulating a carrier signal in accordance with the amplitude variations of a modulating signal, comprising:

an active element having first and second main electrodes and a control electrode;

a first impedance element connected from said first main electrode to a first terminal adapted to be connected to a source of bias voltage;

a second impedance element, substantially equal in value to said first impedance element, connected from said second main electrode to a point of reference potential;

means for applying a carrier signal of a given high frequency between said control electrode and said point of reference potential, whereby a first high-frequency signal wave appears at the first main electrode and a second high-frequency signal wave appears at the second main electrode, said first and second signal waves being of said given frequency substantially equal in magnitude and substantially 180° out of phase with respect to each other;

first and second PIN diodes having substantially matched voltage-current characteristics;

the first main electrode of the active element being coupled to one electrode of said first PIN diode said second main electrode being coupled to one electrode of said second PIN diode, the other electrode of said first PIN diode being connected to the other electrode of said second PIN diode, such that the two PIN diodes are connected in alternating current series circuit between the first and second main electrodes of the active element;

a first capacitor having one terminal coupled to said means for applying said high-frequency carrier signal and a second terminal coupled to the junction formed by the interconnection of the two PIN diodes, the value of said capacitor being selected so that the portion of the coupled high-frquency carrier signal at the junction formed by the two PIN diodes is 90° out of phase with respect to the signal itself;

the junction of said PIN diodes defining a first terminal;

the junction of said first main electrode and one electrode of said first PIN diode defining a second terminal;

the junction of said second main electrode and one electrode of said second PIN diode defining a third terminal;

means for applying a bias voltage between said point of reference potential and one of said three terminals;

a third resistor having (*i*) one terminal connected to the junction formed by the interconnection of the two PIN diodes and the second terminal of the first capacitor and (*ii*) a second terminal connected to one terminal of a first coupling capacitor, the other terminal of said first coupling capacitor being connected to a point of reference potential; and means for coupling a modulating signal between said second terminal of the third resistor and said point of reference potential, said modulating signal serving to increase the impedance presented by one PIN diode to the high-frequency carrier signal while simultaneously decreasing the impedance presented by the other PIN diode to the high-frequency carrier signal, thus providing a high-frequency signal at the output terminal the amplitude of which varies with the amplitude of the modulating signal, said variable amplitude high-frequency signal combining with said reference signal to provide a carrier signal of varying phase angle between the first terminal of said third resistor and said point of reference potential.

12. A circuit according to claim 11 wherein a first DC bias voltage source is connected between said second terminal and said point of reference potential, and a second DC bias voltage source, of the same magnitude but of opposite polarity to the first DC bias source, is connected between said third terminal and said point of reference potential.

* * * * *